United States Patent [19]

Lauritzen et al.

[11] Patent Number: 5,441,299
[45] Date of Patent: Aug. 15, 1995

[54] AIR BAG INFLATOR SUBASSEMBLY FOR INSTALLATION ONTO THE DASHBOARD SUBSTRATE OF A MOTOR VEHICLE

[75] Inventors: Donald R. Lauritzen, Hyrum; Joseph L. Ralston, Ogden; Larry D. Rose, Layton, all of Utah

[73] Assignee: Morton International, Inc., Chicago, Ill.

[21] Appl. No.: 233,161

[22] Filed: Apr. 25, 1994

[51] Int. Cl.$^6$ .................... B60R 21/20; B60R 21/26
[52] U.S. Cl. .................. 280/728.2; 280/732; 280/741
[58] Field of Search .............. 280/728 A, 732, 731, 280/730 R, 736, 740, 741, 752, 728 B, 728 R

[56] References Cited

U.S. PATENT DOCUMENTS

| | | | |
|---|---|---|---|
| 3,481,625 | 12/1969 | Chute | 280/739 |
| 3,622,176 | 11/1971 | Byer | 280/732 |
| 3,632,136 | 1/1972 | Foltz | 280/732 |
| 3,817,263 | 6/1974 | Bendler et al. | 280/741 |
| 4,153,273 | 5/1979 | Risko | 280/740 |
| 4,944,527 | 7/1990 | Bishop et al. | 280/741 |
| 5,087,067 | 2/1992 | Seki et al. | 280/732 |
| 5,088,764 | 2/1992 | Augustitus et al. | 280/731 |
| 5,100,170 | 3/1992 | Mihm et al. | 280/736 |
| 5,135,252 | 8/1992 | Suran et al. | 280/732 |
| 5,240,282 | 8/1993 | Wehner et al. | 280/728 R |
| 5,263,739 | 11/1993 | Webber et al. | 280/728 A |
| 5,332,256 | 7/1994 | Lauritzen et al. | 280/728 A |

FOREIGN PATENT DOCUMENTS

| | | | |
|---|---|---|---|
| 4309925 | 10/1993 | Germany | 280/728 B |
| 5042856 | 2/1993 | Japan | 280/728 A |
| 5229392 | 9/1993 | Japan | 280/752 |

*Primary Examiner*—Eric D. Culbreth
*Assistant Examiner*—Peter C. English
*Attorney, Agent, or Firm*—Mark F. LaMarre; Nick C. Kottis; Gerald K. White

[57] ABSTRACT

An air bag inflator subassembly is described which when installed onto a dashboard substrate forms a complete air bag inflator unit. The air bag inflator subassembly comprises a plurality of flanges formed integral to the body of the inflator. An air bag cushion and retainer cover are attached to the inflator subassembly. The subassembly eliminates the need for a separate canister and simplifies the process of installing the air bag inflator unit. The subassembly is installed on the dashboard substrate and is attached to the appropriate electrical connections. The subassembly utilizes existing vehicle hardware to form part of the air bag canister.

11 Claims, 4 Drawing Sheets

AIR BAG INFLATOR SUBASSEMBLY FOR INSTALLATION ONTO THE DASHBOARD SUBSTRATE OF A MOTOR VEHICLE

BACKGROUND OF THE INVENTION

1. Field of the Invention

This invention relates generally to inflatable-type modular occupant restraint systems for passenger vehicles or, as they are more commonly known, air bag restraint systems. More particularly, this invention relates to an air bag module subassembly which can be attached to an instrument panel substrate of a vehicle to form a complete air bag restraint system.

2. Description of Related Art

An air bag restraint system typically includes a canister, which has an open side and which canister encloses an inflator and at least part of an air bag, and a cover which conceals the module from view. A driver side air bag module is typically mounted in the center of the steering wheel behind a protective cover. When the air bag module is designed for the passenger side of a vehicle, the container may be located just behind the vehicle dashboard, cosmetic cover, or passenger side instrument panel (hereinafter referred to as "dashboard") and the cover may form an integral part of the vehicle dashboard.

When the vehicle is involved in a collision, a crash signal initiates operation of the inflator to cause the air bag to deploy. The inflator provides an inert gas (e.g., nitrogen) which is directed under pressure into the air bag to force the air bag out of the canister incorporated in the module and into the passenger compartment of the vehicle. As the air bag is forced out of the module, the pressure exerted on the driver-side protective cover or dashboard causes selected portions of the cosmetic cover to separate, in a predetermined manner, along tear seams or breakaway seams (hereinafter referred to as "tear seams") to enable the air bag to be directed into the passenger compartment.

Typically, an air bag inflator assembly as a complete unit is attached to the inside of a vehicle dashboard as is illustrated by Webber et al., U.S. Pat. No. 5,263,739, and Seki et al., U.S. Pat. No. 5,087,067. These air bag module assemblies include a canister containing an inflator and at least part of an air bag cushion. As the designs of automotive air bag restraint systems are reevaluated in order to reduce their size and complexity, it has been noted that the use of existing vehicle components as part of the air bag assembly would simplify the air bag restraint system. Therefore, it would be preferable to provide an air bag restraint system subassembly that works in conjunction with the existing motor vehicle hardware to produce the air bag restraint system. In these instances, it has been determined that it is preferable to have an air bag inflator assembly which can easily be attached to the dashboard substrate to form an air bag module assembly without the necessity for a separate air bag canister. "Substrate" herein means the structural components which support the dashboard.

SUMMARY OF THE INVENTION

The objective of this invention is to provide a subassembly which, when installed on the dashboard substrate of a motor vehicle, will create a complete occupant restraint unit. This and other objectives of the invention, which will become apparent from the following description, have been achieved by a novel air bag subassembly comprising an inflator having flanges formed integrally in the body thereof and an air bag cushion attached to the inflator. Herein, "integral" or "integrally" means that the inflator and flanges are formed from one continuous piece of material. Apertures formed on one side of the inflator body permit gas to be exhausted from the inflator into the air bag cushion when the inflator is actuated. The air bag cushion is retained in a folded condition by a retaining cover that is attached to the inflator to form a complete air bag inflator subassembly. The subassembly is installed on the dashboard substrate of a vehicle to make an air bag assembly.

BRIEF DESCRIPTION OF THE DRAWINGS

With this description of the invention, a detailed description follows with reference being made to the accompanying figures of drawings which form part of the specification related thereto, in which like parts are designated by the same reference numbers, and of which:

FIG. 6 is an exploded isometric view illustrating the relative placement of the air bag subassembly of this invention to the dashboard substrate.

DETAILED DESCRIPTION OF THE INVENTION

Description of the Preferred Embodiment

Figure 1:
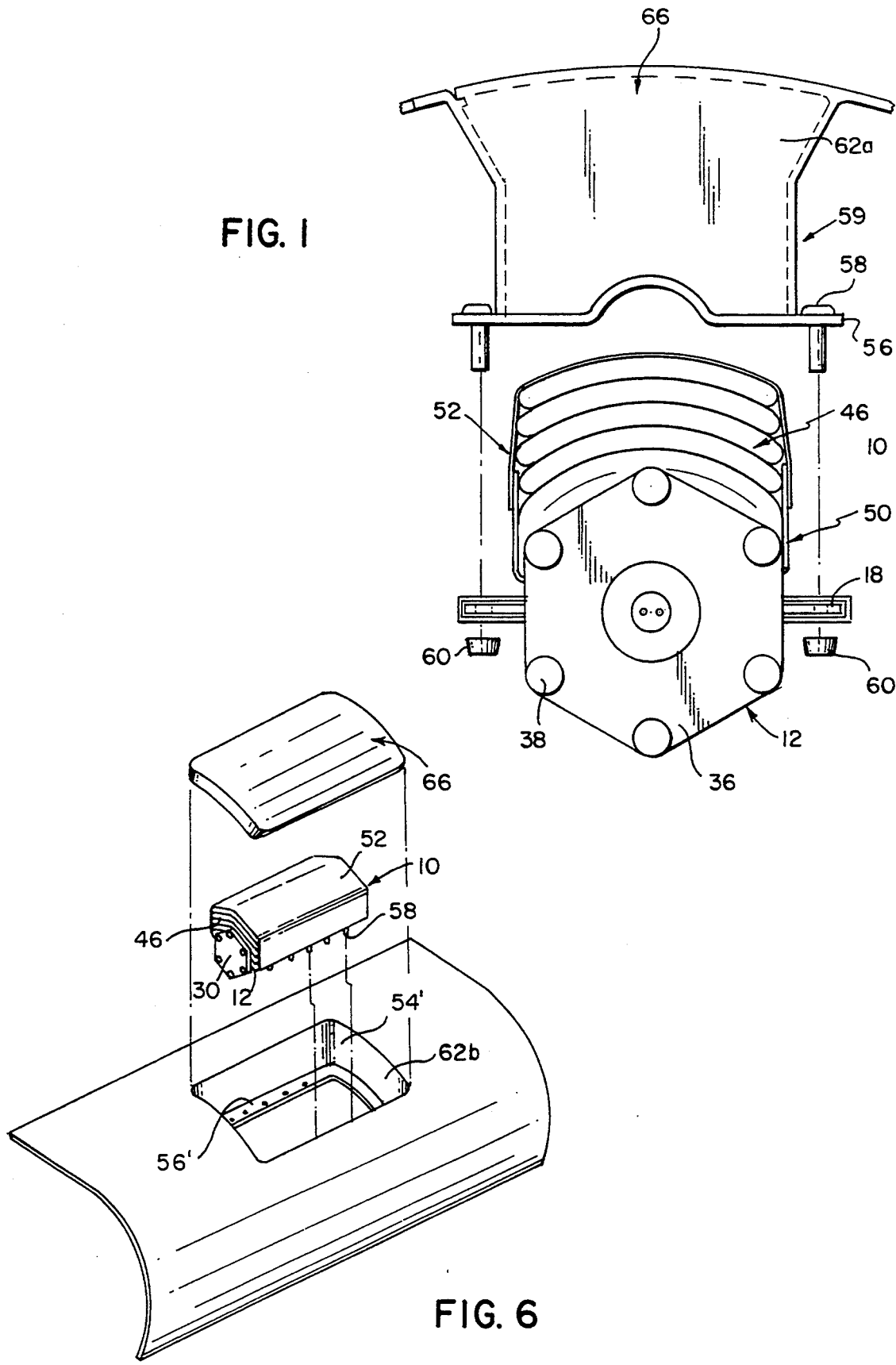
FIG. 1 is an exploded side-plan view of the inflator of this invention being attached to the substrate of a dashboard.
Figure 2:
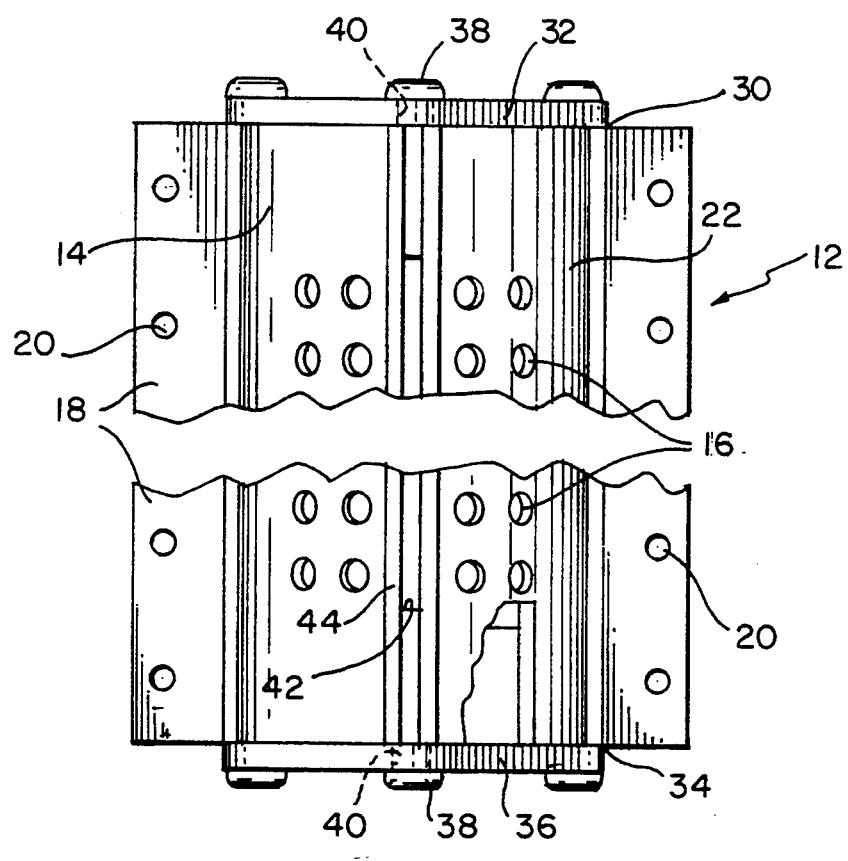
FIG. 2 is a fragmented top-plan view illustrating the inflator of this invention.
Figure 3:
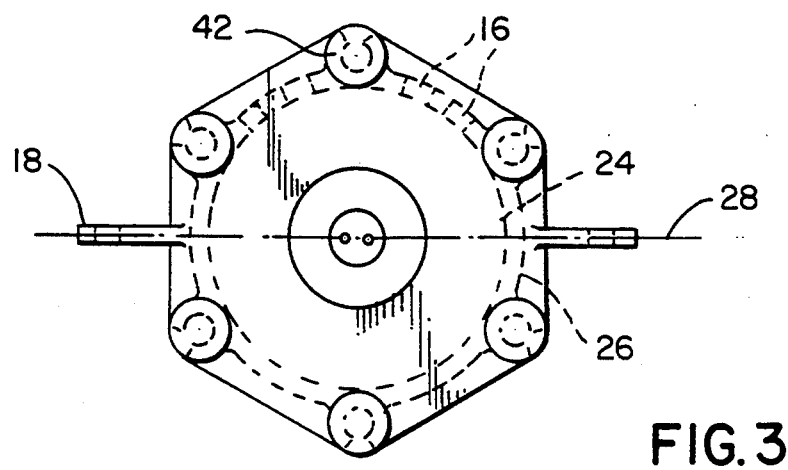
FIG. 3 is a side-plan view of the inflator of FIG. 2.

Referring to FIGS. 1, 2, and 3, the inflator subassembly of this invention is shown generally at 10. The inflator 12, as shown in FIG. 2, comprises an elongated tubular body 14 having a plurality of apertures 16 formed therein. A number of first flanges 18 having first apertures 20 formed therein are formed integral to the inflator 12. Herein, "integral" or "integrally" means that the inflator and flanges are formed from one continuous piece of material, without the use of welding or other attachment methods. The first flanges 18 divide the inflator surface 22 into a number of arcs, in this case two arcs—a first arc 24 and a second arc 26. The apertures 16 for the normal inflation of the air bag cushion 46 are limited to the first arc 24. However, additional apertures may be formed in the second arc 26 as overpressure relief mechanism. The first flanges 18 may be oriented so as to fall in the same plane 28, as shown in FIG. 3 however, different orientations may be used depending on the design of the dashboard substrate. The inflator first end 30 is sealed with a first end closure or plate 32 and the inflator second end 34 is sealed by a second end closure or plate 36 by fasteners 38 inserted through fastener holes 40 in the plates 32 and 36 and engaged with channels 42 formed into ribs 44 integral to the elongated tubular body 14.

An air bag cushion 46 is attached to the inflator 12 by securing the gas inlet opening 48 of the air bag cushion to the inflator first flanges 18. A retention bracket 50 and retention cover 52 may be used to hold the air bag cushion 46 in a folded condition prior to the installation of the inflator assembly 10 onto a dashboard substrate 54.

Figure 4:
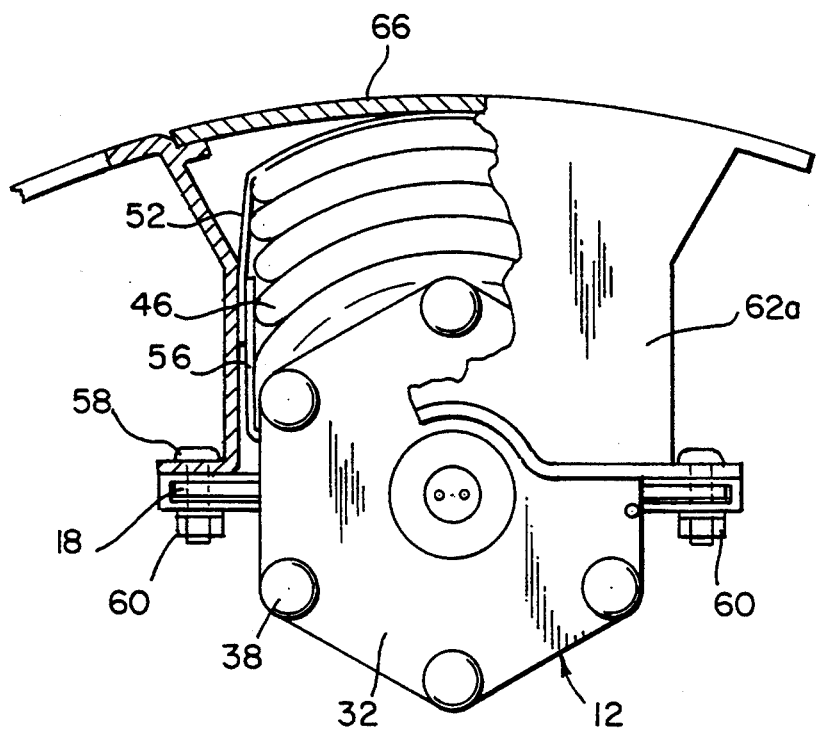
FIG. 4 is a side-plan view of the subassembly attached to a dashboard substrate.
Figure 5A:
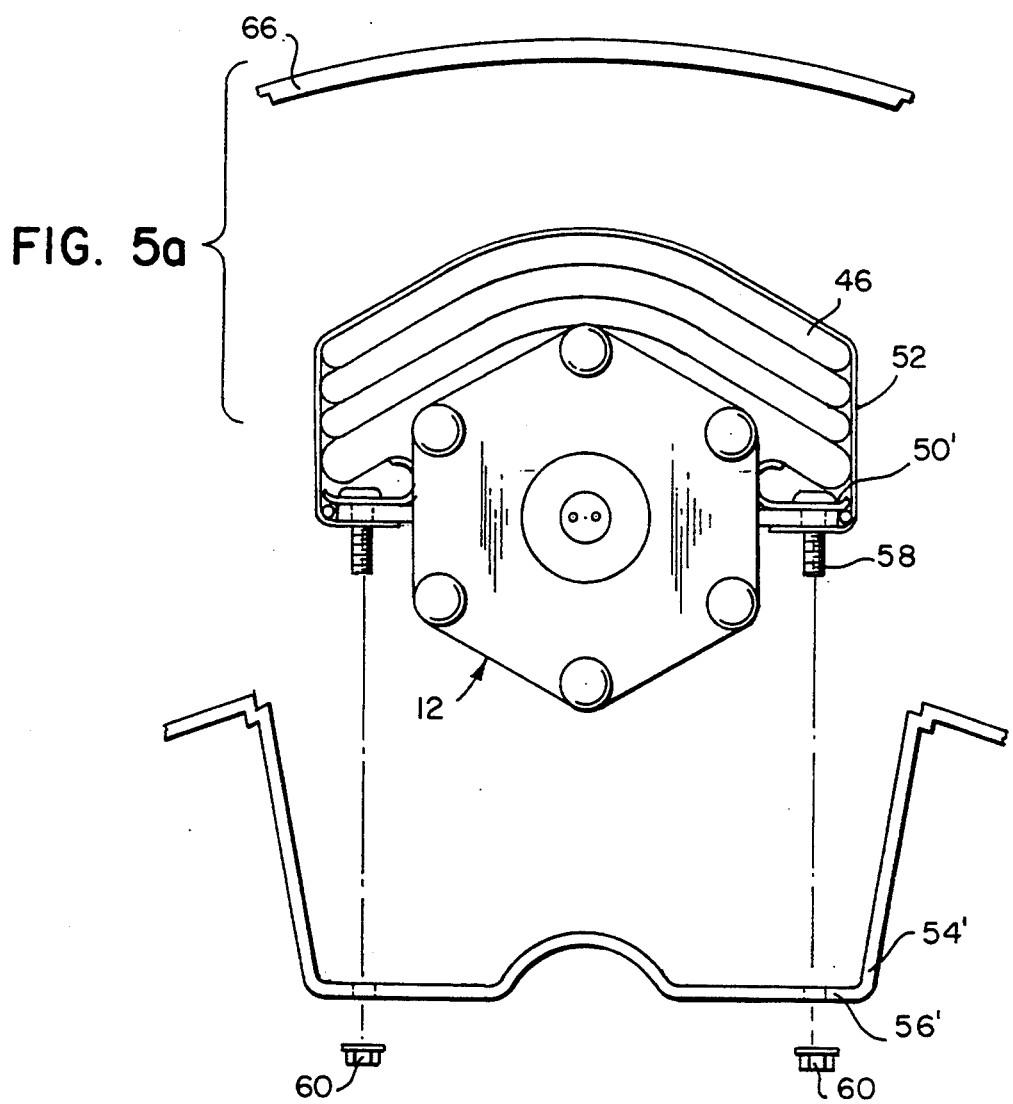
FIGS. 5a and 5b are side-plan views illustrating an alternate installation arrangement.
Figure 5B:
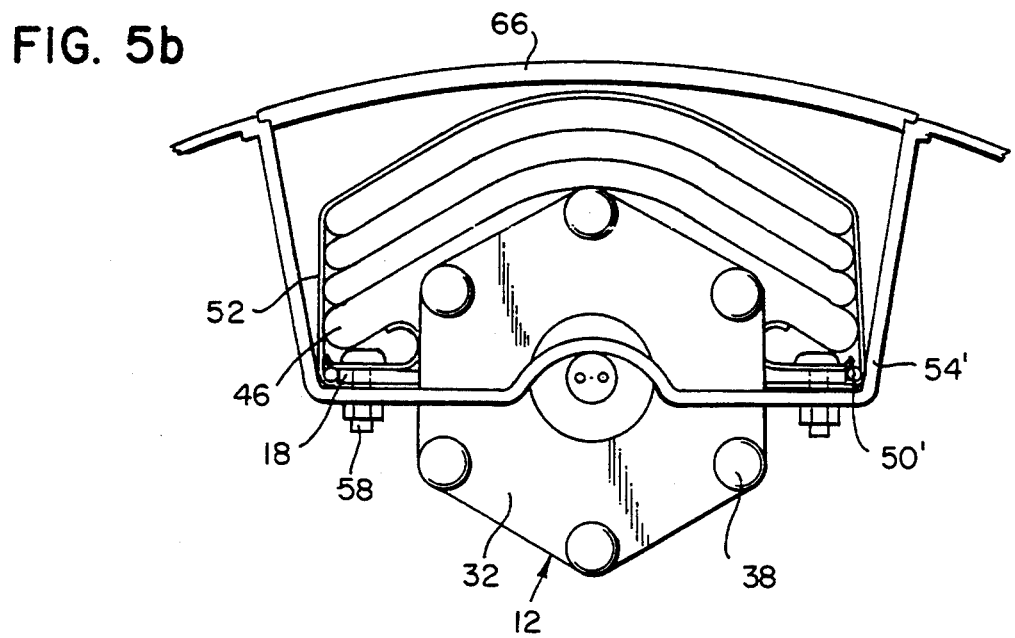

To install the inflator subassembly 10 the subassembly can be attached to the bottom of the dashboard substrate 54 and secured to second flanges 56 by second fasteners 58 secured by nuts 60, as shown in FIGS. 1 and 4. Substrate end panels 62a and 62b, as shown in FIGS. 1, 4, and 6 seal the respective ends of substrates 54 and 54'. The dashboard substrate 54 is sealed with a movable cover 66 as known in the art. An alternate method for installing the inflator assembly is shown in FIGS. 5a and 5b and FIG. 6. These figures use the same reference characters as in the embodiment described above, with the addition of a "prime" to designate the alternative forms of the retention bracket (50'), dashboard substrate (54') and second flanges (56'). Here the assembly is inserted into the dashboard substrate 54' from above and is secured as stated hereinabove.

The inflator 12 of this invention can be a standard inflator, for example, as illustrated in U.S. Pat. No. 4,296,084 to Schneider, which patent is assigned to the assignee of the present invention. This patent is incorporated herein by reference. The inflator is modified as disclosed herein to form flanges integral to the inflator. Preferably, the elongated tubular body 14 is formed from aluminum by extrusion in a shape as described hereinabove. Inflator apertures 16 are formed in the elongated tubular body by mechanical drilling or punching. The elongated tubular body 14 is loaded with an ignition train, gas generating material, and a screen and filter assembly. End plates are then attached as described hereinabove. This invention can be used in conjunction with a hybrid inflator or stored gas inflator, which inflators are known in the art. These alternate inflators are modified as noted hereinabove to form flanges integral to the inflator body.

The air bag cushion 46 is typically fabricated from a woven material such as coated or uncoated polyester, or a polyamide fiber such as nylon 6, or nylon 6,6, for example. It is to be understood, however, that the practice of the invention is not limited to the use of air bags fabricated of an particular material or by the particular process.

The air bag cushion is retained on the inflator in a folded condition by a retention cover. The retention cover 52 may be formed from Tyvek, a woven polyamide fiber such as nylon 6, or nylon 6,6, or a semi-rigid polymer material with a tear seam formed therein to provide for the deployment of the air bag cushion. The retention cover 52 is attached to the inflator 12 by a retention bracket 50, which is typically formed from sheet steel or aluminum.

Figure 7:
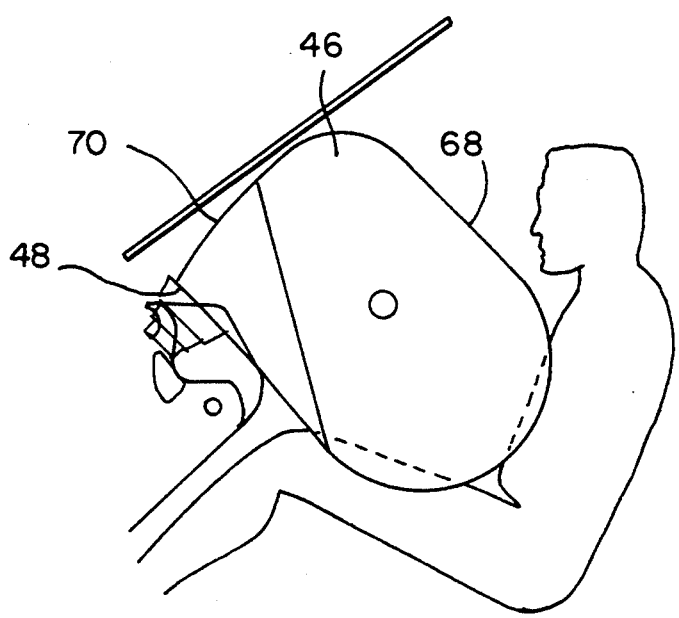
FIG. 7 illustrates the air bag subassembly of this invention attached to a dashboard substrate and in a deployed condition.

The air bag subassembly 10 of this invention is installed in a motor vehicle as described hereinabove. Appropriate electrical connections are made to attach the inflator to sensors and the appropriate ignition system. A signal from a crash sensor triggers the inflator 12 to provide gas in order to deploy the air bag cushion 46, as shown in FIG. 7 to protect a vehicle occupant. The air bag cushion 46 in the deployed condition has a first portion 68 which is deployed opposite an occupant of the vehicle. The first portion 68 is connected to a second portion 70 or body of the air bag cushion 46, which terminates in a third portion defining a gas inlet opening 48.

Thus, in accordance with the invention, there has been provided an inflator assembly which can be quickly and easily attached to a dashboard substrate to form an air bag module. The air bag assembly eliminates the need for a separate canister, thereby reducing overall manufacturing cost and the time associated with manufacturing.

While the above description constitutes the preferred embodiment of the present invention, it will be appreciated that the invention is susceptible to modification and change without departing from the proper scope and fair meaning of the accompanying claims.

We claim:

1. A simple one-piece air bag inflator assembly for attachment to a dashboard substrate of a motor vehicle comprising:

an elongated cylindrical inflator for providing a gas at a pressure, said inflator having a tubular outside wall with an outer surface, a first end and a second end, a first end closure attached to said inflator first end and a second end closure attached to said inflator second end to form a sealed tubular chamber, wherein each of said first and second end closures are substantially flat plates attached to the respective inflator ends by fastener means, inflator apertures formed in the outside wall of the inflator for directing generated gas from said sealed tubular chamber, and at least two first flanges integral to the outer surface of the inflator and running the length of the inflator, said first flanges having first apertures formed therein, wherein said first flanges divide said inflator surface into a first arc and a second arc wherein said inflator apertures are contained within one of said arcs, said inflator also including a plurality of channels integral to the outside wall of said inflator and running the length of the inflator, each of said channels defining a central aperture wherein said fastener means comprises fasteners which engage with said central apertures of said channels;

an air bag cushion in a folded condition while being stored, said air bag cushion having a first portion, which when said air bag cushion is deployed is disposed opposite an occupant of the vehicle, a second portion attached to said first portion, which terminates in a third portion defining a gas inlet opening for said air bag cushion, said air bag cushion third portion attached to at least two separate of the first flanges of said inflator such that said inflator apertures exhaust the gas into said air bag cushion for the normal inflation thereof; and an air bag retention means that maintains the air bag cushion in the folded condition while being stored.

2. The air bag inflator assembly of claim 1 wherein said inflator is formed by extrusion.

3. The air bag inflator assembly of claim 1 wherein two of said first flanges form a plane.

4. A combination comprising:

a) an air bag inflator assembly, including;

an elongated cylindrical inflator having a tubular outside wall with an outer surface, a first end and a second end, a first end closure attached to the first end, and a second end closure attached to the second end to form a sealed tubular chamber, discharge apertures in the tubular outside wall direct gas from the sealed tubular chamber upon actuation of the inflator, and at least two first flanges integral to the outer surface of the tubular outside wall and running the length of the inflator, said first flanges having first apertures formed therein;

an air bag cushion in a folded condition while being stored, said air bag cushion having a portion defining a gas inlet opening attached to at least two of the first flanges such that the discharge apertures exhaust the gas into said air bag cushion for the normal inflation thereof; and an air bag retention cover that overlays the air bag cushion and maintains the air bag cushion in the folded condition while being stored; and b) a vehicular dashboard having an inside surface and an outside surface, with a substrate in spaced relation to the inside surface, the substrate comprising at least one pair of oppositely facing side walls which include a first end and a second end, with second flanges attached to the second end of the side walls, the second flanges having second apertures therein, first fastener means passed through said second apertures in said second flanges and said first apertures in said first flanges secure said air bag inflator assembly with said vehicular dashboard and wherein said vehicular dashboard forms a movable deployment cover overlying the air bag retention cover.

5. The combination of claim 4 wherein the tubular outside wall of said inflator is formed by conventional extrusion.

6. The combination of claim 4 wherein said inflator further comprises a plurality of channels which are integral to the outside wall of said inflator and running the length of said inflator, with each of the channels defining a central aperture.

7. The combination of claim 4 wherein said air bag retention cover is formed of fiber reinforced paper or a woven polyamide fiber.

8. The combination of claim 4 wherein the first flanges are planar and project normal to the outer surface of said inflator.

9. The combination of claim 4 wherein said air bag inflator assembly is attachable to either the bottom side or the top side of the dashboard substrate.

10. The combination of claim 4 wherein said air bag inflator assembly is attached to the bottom side of the dashboard substrate.

11. The combination of claim 4 wherein said air bag inflator assembly is attached to the top side of the dashboard substrate.

* * * * *